May 13, 1952     I. W. DOYLE ET AL     2,596,222
ELECTRICALLY OPERATED AERIAL CAMERA
HAVING HINGED MAGAZINE SECTIONS
Filed May 30, 1945     11 Sheets-Sheet 1

INVENTOR
IRVING W. DOYLE
BY CARL V. JOHNSON
Blair, Curtis + Hayward
ATTORNEYS

May 13, 1952

I. W. DOYLE ET AL 2,596,222

ELECTRICALLY OPERATED AERIAL CAMERA
HAVING HINGED MAGAZINE SECTIONS

Filed May 30, 1945

INVENTOR
IRVING W. DOYLE
BY CARL V. JOHNSON

ATTORNEYS

May 13, 1952 I. W. DOYLE ET AL 2,596,222
ELECTRICALLY OPERATED AERIAL CAMERA
HAVING HINGED MAGAZINE SECTIONS
Filed May 30, 1945 11 Sheets-Sheet 10

Fig. 13.

INVENTOR
IRVING W. DOYLE
BY CARL V. JOHNSON
Blair, Curtis & Hayward
ATTORNEYS

May 13, 1952     I. W. DOYLE ET AL     2,596,222
ELECTRICALLY OPERATED AERIAL CAMERA
HAVING HINGED MAGAZINE SECTIONS Filed May 30, 1945     11 Sheets-Sheet 11

INVENTOR
*Irving W. Doyle*
BY *Carl V. Johnson*
*Blair, Curtis + Hayward*
ATTORNEYS Patented May 13, 1952

2,596,222

UNITED STATES PATENT OFFICE 2,596,222

ELECTRICALLY OPERATED AERIAL CAMERA HAVING HINGED MAGAZINE SECTIONS

Irving W. Doyle, Massapequa, and Carl V. Johnson, Kew Gardens, N. Y., assignors to Fairchild Camera and Instrument Corporation, Jamaica, N. Y., a corporation of Delaware Application May 30, 1945, Serial No. 596,670

2 Claims. (Cl. 95—12.5)

This invention relates to cameras, and more particularly to an aerial camera having a magazine equipped with a focal plane shutter.

Aerial photography at high altitudes is efficiently accomplished with a camera equipped with a between-the-lens shutter of relatively low speed, as such shutter is capable of stopping the relatively slow motion of the image across the focal plane by reason of the high altitude. However, where the circumstances require high speed, low altitude reconnaissance photography as, for example, during tactical military operations, shutter speeds well in excess of those at which between-the-lens shutters are capable are required. Hence the camera for this type of work is customarily equipped with a focal plane shutter.

Accordingly it may be seen that at least two different types of camera are required for high and low altitude aerial photography. These cameras are quite bulky, heavy and expensive. Accordingly, where two or more cameras are carried, substantial weight is added to the airplane. It is accordingly among the objects of this invention to provide an aerial camera equipped with both a between-the-lens and focal plane shutter so that the camera may be used for low or high altitude photography. Other objects will be in part apparent and in part pointed out hereinafter.

In accordance with one form of our invention, the camera includes a cone, a body and a magazine, the cone having a between-the-lens shutter disposed therein, and the camera body having driving mechanism for winding and tripping the between-the-lens shutter. The magazine, which is detachably mounted on the camera body includes a focal plane shutter in one portion hingedly connected to another portion of the magazine wherein are located a pressure plate and vacuum system, together with driving mechanism for winding the shutter operating the pressure plate and vacuum system, as well as for transporting the film. This magazine is interchangeable with a conventional magazine, and when mounted on the camera body is operable to take pictures when the between-the-lens shutter is immobilized and opened.

In the drawing, wherein we have shown one form of our invention,

Figure 8 is a fragmentary schematic view of the film pressure plate and motor switch;

Similar reference characters refer to similar parts throughout the views of the drawing.

Figure 3:
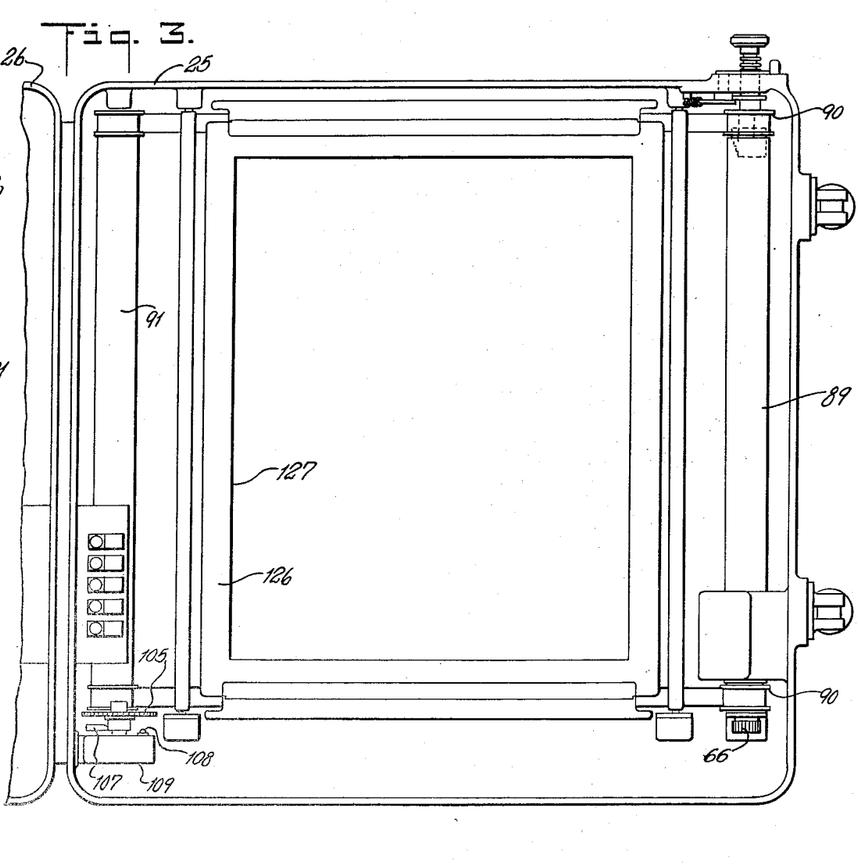
Figure 3 is a fragmentary plan view of the lower portion of the magazine showing the focal plane shutter.
Figure 3A:
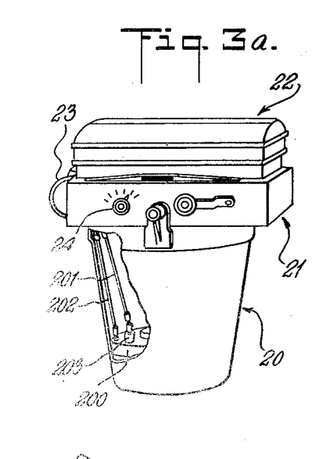
Figure 3A is a substantially reduced perspective view of the entire camera.

Referring first to Figure 3A, the camera comprises a cone, a body containing driving mechanism, and a magazine, generally indicated respectively at 20, 21 and 22. Disposed within the cone 20 is a between-the-lens shutter 200, of a type conventional in cameras of this character such, for example, as is shown in Fairchild 1,626,032 and 1,661,364. This shutter includes winding and tripping devices operated from mechanism included in the case drive 21 by removable winding and trip rods 201 and 202; the said mechanism is driven by a motor 23. Where the film magazine is of conventional form, i. e. does not include a focal plane shutter, as, for example, that shown in Weiblen et al. 2,131,926, motor 23 also operates the magazine. However, magazine 22, as described hereinbelow, includes its own operating motor, as well as a focal plane shutter. Thus the camera may be equipped with either a conventional magazine, i. e. one that has no focal plane shutter, under which circumstances the between-the-lens shutter 200 is operated in conventional manner, or it may be equipped with magazine 22, which includes a focal plane shutter, under which circumstances the between-the-lens shutter 200 is immobilized. Shutter 200 may be immobilized by removing the winding and trip rods 201 and 202, which are detachably connected to the driving mechanism and shutter by suitable couplings, such as coupling 203, by which the winding rod 201 is connected to the shutter. After the rods have been removed, the shutter is tripped to remove the initial tension. Then the winding coupling 203 is rotated until the shutter blades are wide open, the winding coupling being clamped in this position in any suitable manner, thus to maintain shutter 200 wide open.

Figure 1:
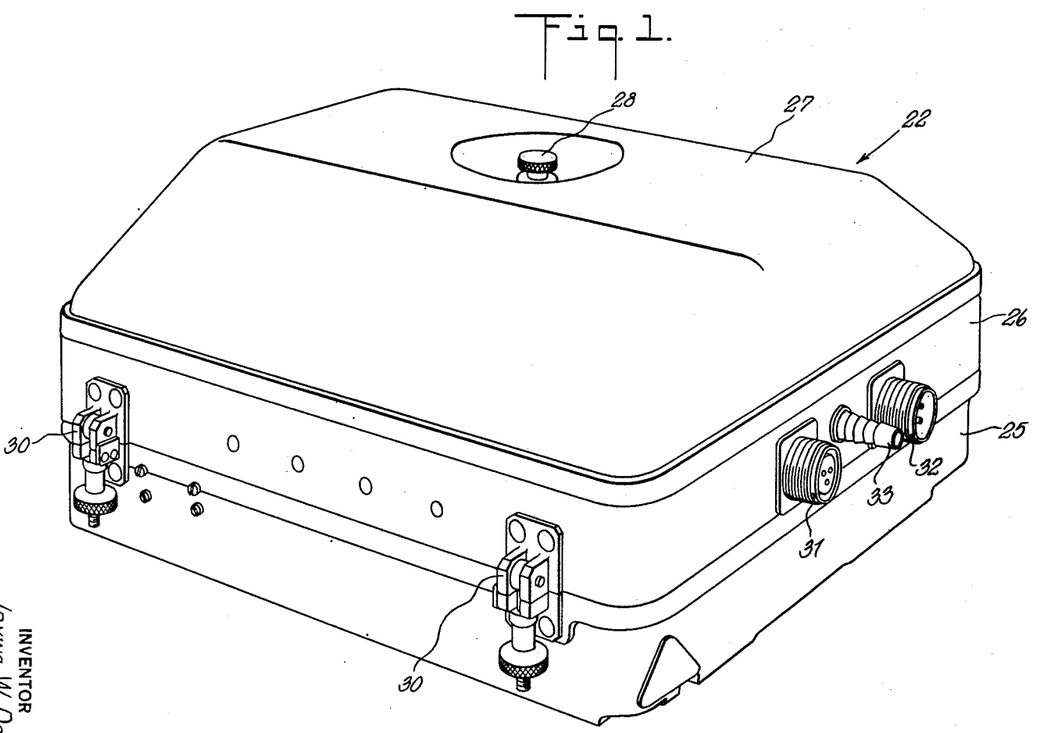
Figure 1 is a perspective view of a film magazine equipped with a focal plane shutter.
Figure 2:
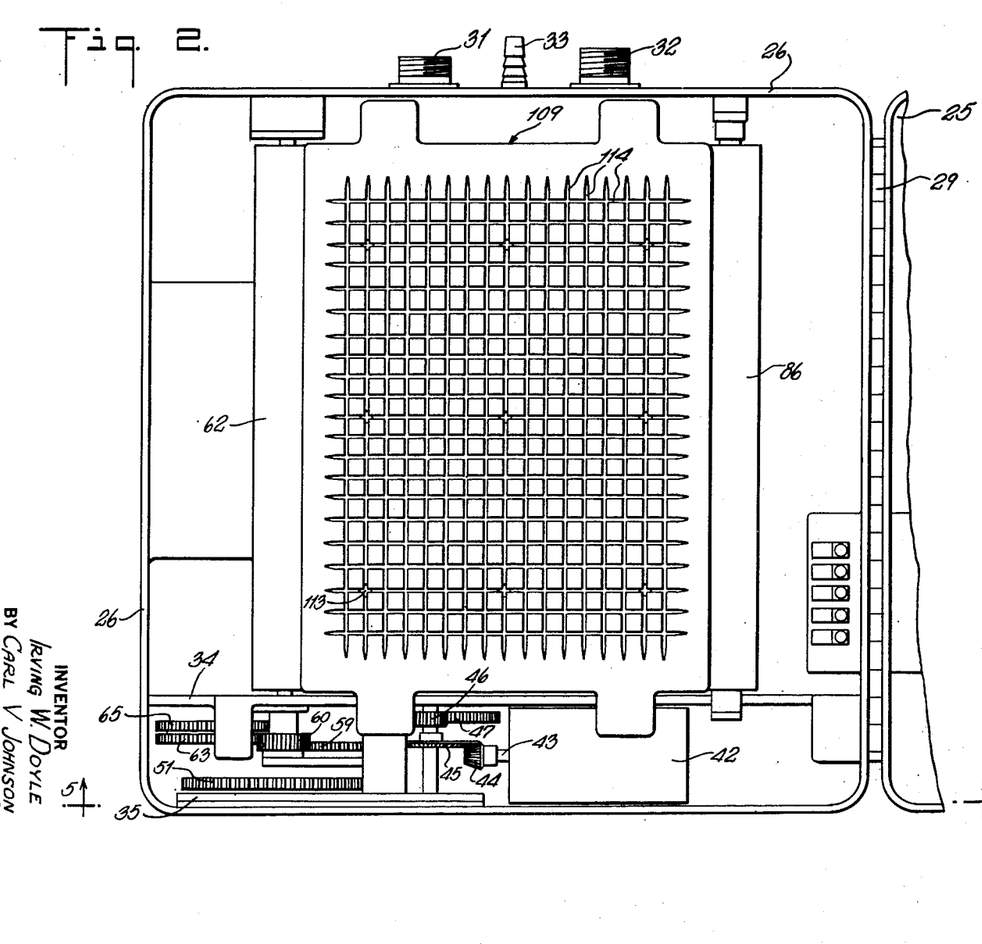
Figure 2 is a reduced fragmentary plan view of the upper portion of the magazine, showing the film pressure plate and a portion of the film moving mechanism.

Referring to Figure 1, magazine 22 includes lower and upper housings 25 and 26, respectively, the latter of which receives a light-tight cover 27 detachably held in position by a thumb screw 28. As shown in Figure 2, housings 25 and 26 are hinged together as at 29, and if Figures 2 and 3 are considered together, it will be seen that the magazine housings may be swung open, thus permitting ready access to various portions thereof.

As shown in Figure 1, the magazine housings may be latched and held securely together by suitable latches 30, the upper casing 26 being provided with sockets 31 and 32, as well as an exhaust nozzle 33, by which the various mechanisms in the magazine may be controlled, as will appear in greater detail below. Upper housing 26 (Figures 2 and 4) has secured in one side thereof a pair of partitions or plates 34 and 35 which, together with a cover plate 36 (Figure 4) comprise a removable operating mechanism unit which we have generally indicated at 37, which includes all of the mechanism by which the cyclic operation of the camera is effected, i. e. by which the shutter is set and the film is fed from its supply to its take-up spools.

Figure 5:
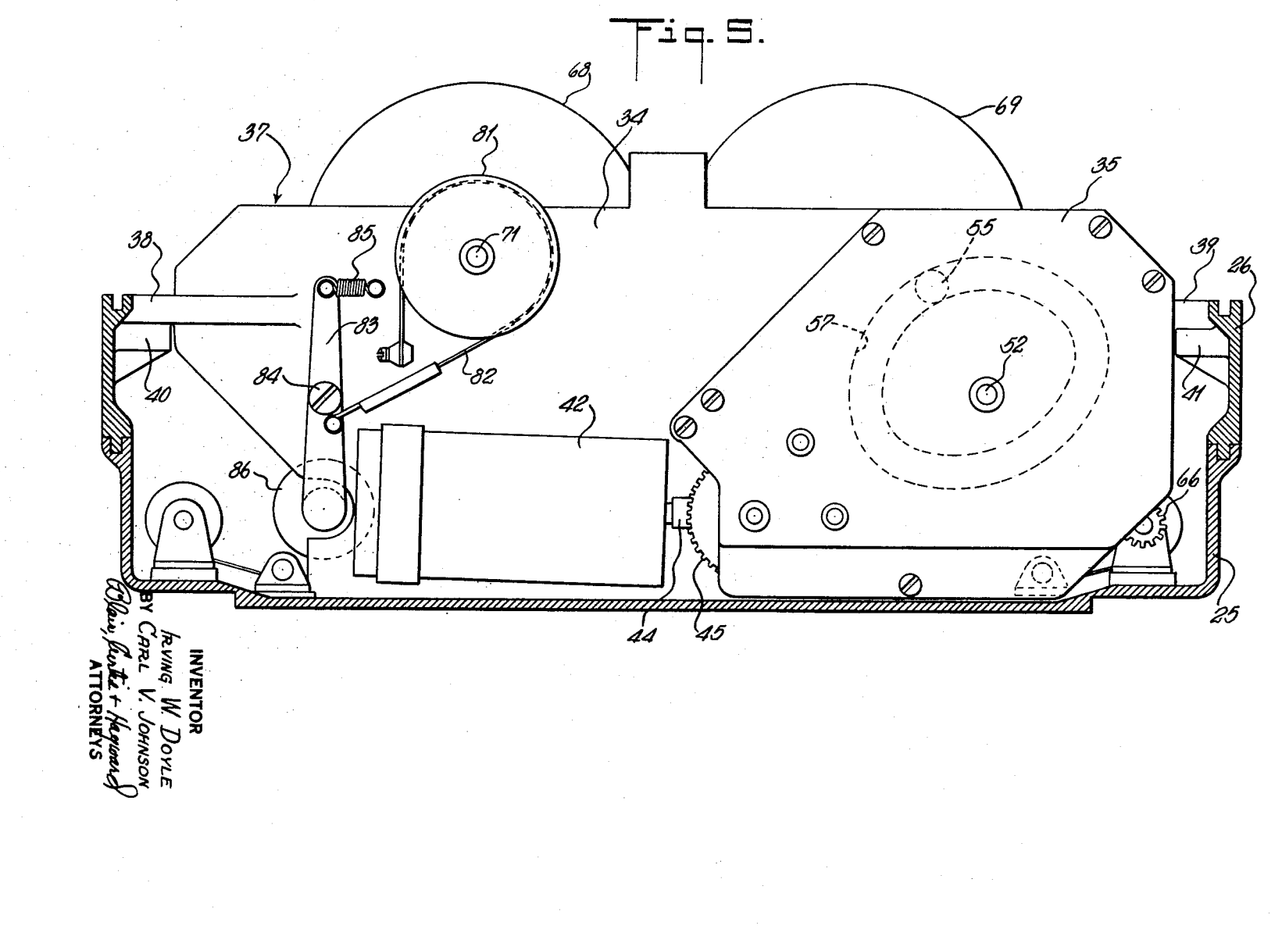
Figure 5 is an enlarged sectional elevation of the magazine of Figure 2 taken along the line 5—5, with the top cover removed.
Figure 6:
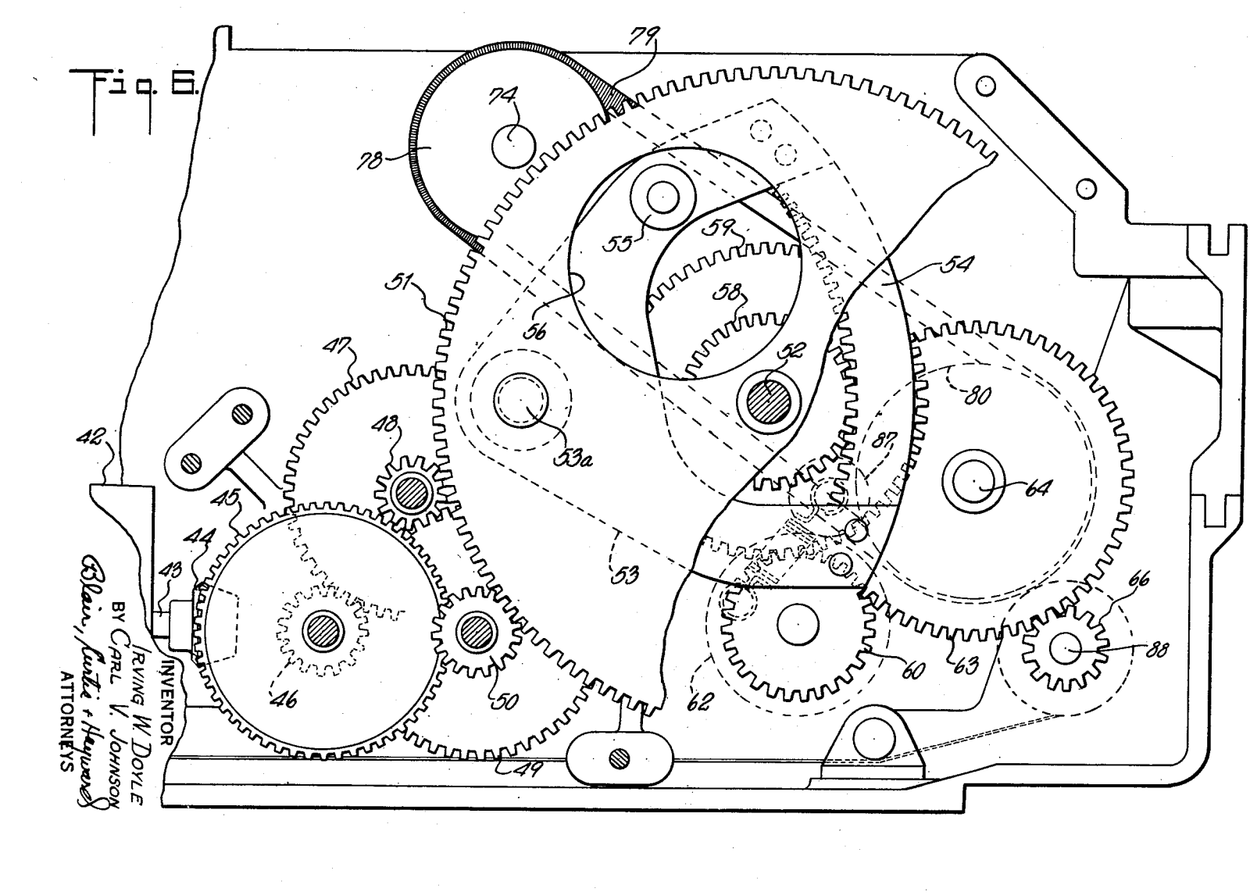
Figure 6 is an enlarged fragmentary sectional elevation of a portion of the film moving and shutter winding mechanism, portions thereof being broken away.
Figure 7:
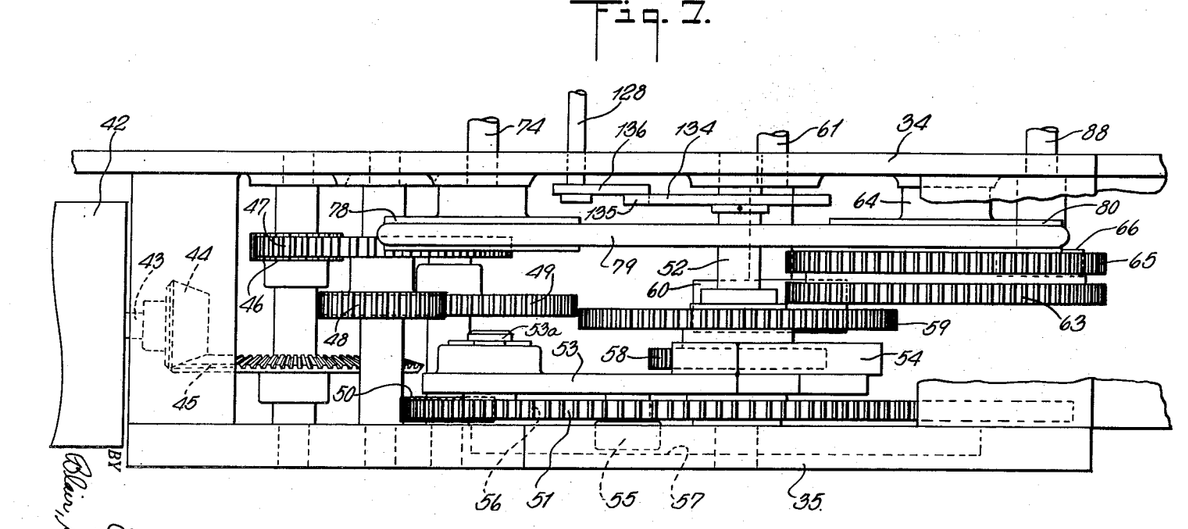
Figure 7 is a top plan view of the mechanism shown in Figure 6.
Figures 9, 10, 11, 12:
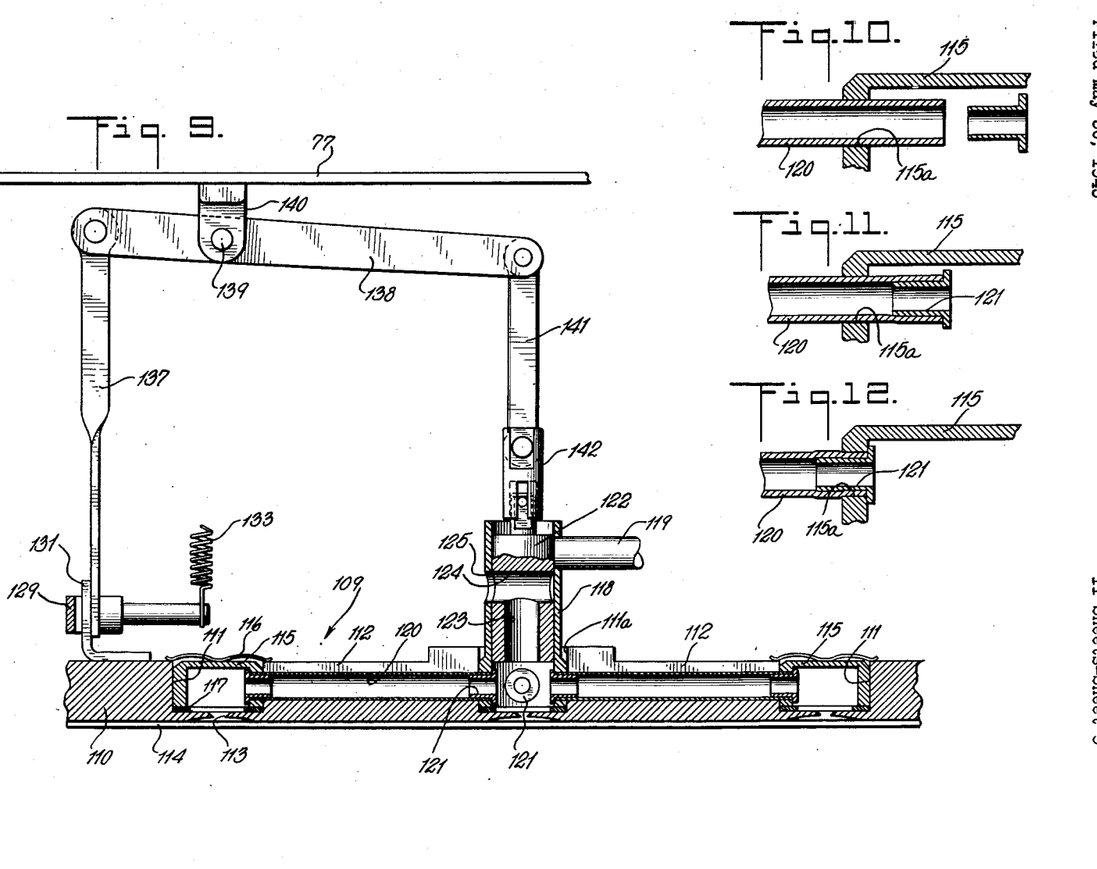
Figure 9 is a fragmentary sectional elevation showing the film pressure plate and associated vacuum system.
Figures 10, 11 and 12 are sectional elevations showing successive operations in installing a portion of the vacuum system.

This driving mechanism unit 37 is best shown in Figures 5 and 6, and includes end flanges 38 and 39 which rest on bosses or shelves 40 and 41 respectively, integrally cast with the side walls of the upper housing 26, the unit flanges being secured to the shelves in any suitable manner. Included in unit 37, and secured to plate 34 in any suitable manner, is an electric motor 42, to the armature shaft 43 (Figure 6) of which is fastened a bevel gear 44. This gear drives a gear train comprising gears and pinions 45, 46, 47, 48, 49 and 50, pinion 50 driving a large main or cycling gear 51 carried by a shaft 52 journaled between plates 34 and 35 (Figure 7). Pivotally secured to gear 51 (Figure 6) is a yoke 53, between the spaced arms of which is secured an arcuate internal gear sector 54, and to one arm of which is secured a cam follower 55 which extends through a large hole 56 formed in gear 51. Cam follower 55 rides in a positive cam slot 57 formed in the inner surface of plate 35. It may now be seen that as gear 51 rotates, sector 54 not only rotates about the center of gear 51, but also moves about the center of its attaching pin 53a, in accordance with the contour of the cam slot 57 (Figure 5). Gear sector 54 meshes with a gear 58 pinned to shaft 52, gear 51 being freely rotatable on this shaft. It will now appear that as gear 51 is rotated, so also is gear 58 and accordingly shaft 52, but at varying speeds in relation to the rotation of gear 51 because of the movement of gear sector 54 as cam follower 55 rides along cam groove 57. The shape of this cam is so designed that acceleration, constant speed and deceleration is imparted to gear 58, for a purpose to be described.

Also fastened to shaft 52, so as to rotate therewith, is a gear 59 which meshes with a gear 60 mounted on a shaft 61, this shaft 61 carrying a metering roller 62 which feeds the film. It will now be seen that rotation of the metering roller is at varying speed, for example, during the first portion of the film feeding operation the roller accelerates so as to overcome the initial substantial inertia of the film spools with their load of film; thereafter the metering roller speed may be constant during the major portion of the film feeding operation, and finally the roller decelerates. Thus, for a certain portion of the cam, its rise is such that there is sufficient relative motion between gear sector 54 and gear 58 as to nullify any rotary motion that would ordinarily be imparted to the gear. Under such circumstances, little or no rotation of metering roller 62 would result. Thus sufficient time may be gained to allow the driving motor to come to a rest after the motor circuit has been broken, as will be described.

Gear 60, as is more clearly shown in Figure 7, meshes with, so as to drive a gear 63 mounted on a shaft 64 (Figure 6) and is coupled to a mutilated gear 65 (Figure 7) which in turn is adapted to mesh with a shutter pinion 66. This mutilated gear and pinion may structurally and functionally resemble those disclosed in our copending application Serial No. 623,620, filed October 22, 1945, now Patent No. 2,514,991, issued July 11, 1950. The edentate portion of this mutilated gear is in alignment with the shutter pinion at the end of each operative cycle, as disclosed in said aforementioned copending application.

As shown in Figure 5, film supply and take-up spools 68 and 69, respectively, are provided. Spool 68 is mounted on spindles 70 and 71 (Figure 4), the former of which is carried on an arm 72 which is pivotable to facilitate installation and removal of the spool. Spool 69 is adapted to be mounted on spindles 73 and 74, the former of which is also mounted on a pivotable arm 75 for the same purpose. These arms 72 and 75 are carried by a frame plate 76 between which and unit 37 extends a beam 77. Take-up spool spindle 74 (Figures 6 and 7) carries at its outer end a pulley 78, which is connected by a spring belt 79 to a pulley 80 mounted on shaft 64. The ratios of pulleys 78 and 80 are such as to maintain the film taut between the take-up spool and metering roll 62, regardless of the variable diameter of the film on the take-up spool. Supply spool spindle 71 (Figure 5) has a brake drum 81 connected thereto, and about this drum extends a brake band 82 anchored at one end to plates 37, and at the other end to an arm 83. This arm 83 is pivoted on a screw 84, and is under a constant clockwise bias by a spring 85. The lower end of arm 83 carries a roller 86 under which the film is trained so that the film is held in a taut condition, all as is described in considerable detail in the copending application of Doyle and White, Serial No. 510,146, filed November 13, 1943, now Patent No. 2,403,587, issued July 9, 1946. Thus the film from supply spool 68 is trained around and under guide roller 86, across the focal plane, under the pressure plate, as will be described, thence under metering roller 62 against which it is held by a pressure roller 87, and thence to take-up spool 69, successive increments of film being cyclically fed by the mechanism hereinbefore described in very much the manner set forth in detail in the above-noted Doyle and White copending application.

Figure 13:
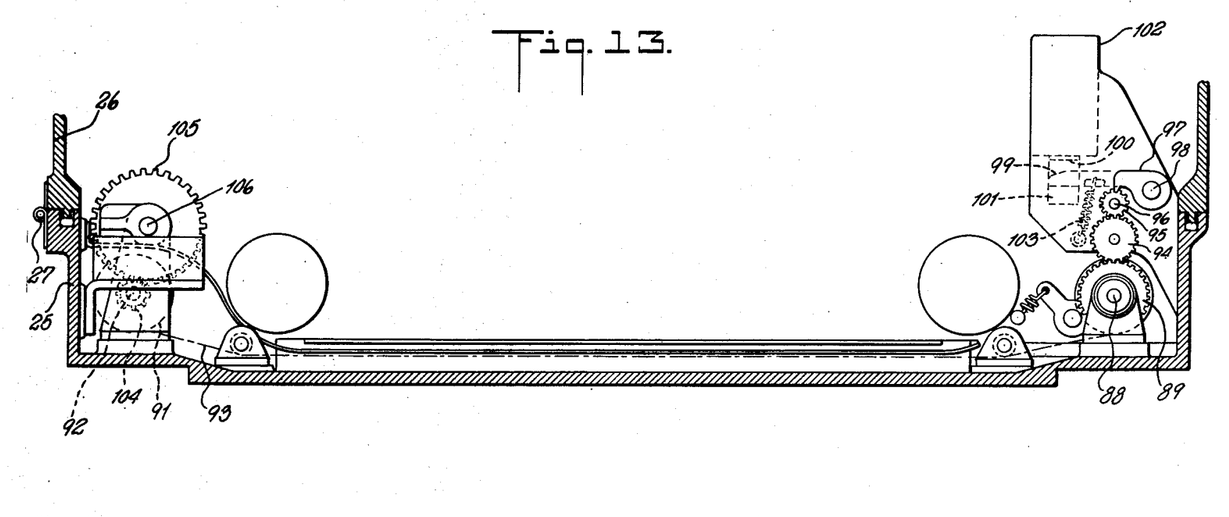
Figure 13 is a side view of the focal plane shutter.

Shutter pinion 66 (Figure 6) is carried by a shaft 88 on which is mounted, as may be seen in Figure 3, a shutter spool 89. This shaft also carries the usual tape drums 90, which carry the tapes of the capping curtain. The other shutter spool 91 is rotatably mounted in conventional manner at the other end of housing 25 on a shaft 92 (Figure 13), a conventional shutter curtain 93 being fastened to the two spools so that its slit (not shown) may be drawn across the aperture in the focal plane in the usual manner during exposure and resetting operation.

Shutter pinion 66 (Figure 13) meshes with a smaller gear 94 which, in turn, meshes with a pinion 95 carried by a shaft 96. This shaft 96 may also be attached to a governor (not shown) by which the velocity of the shutter curtain may be held at a constant value during exposure operation. Pinion or ratchet 95 is adapted to be engaged by a pawl 97 carried by a shaft 98, which shaft also has secured thereto an arm 99 disposed within the slot 100 of the armature 101 of a solenoid 102. When the solenoid is energized, its armature 101 raises arm 99, thus lifting pawl 97 out of engagement with ratchet 95 to trip the shutter. A spring 103 is preferably provided to bias pawl 97 toward ratchet 95. Shaft 92 of the other shutter spool 91 also carries a pinion 104 which meshes with a gear 105 carried by a shaft 106. To one end of this shaft is secured a switch arm 107 (see Figure 3) adapted to engage the button 108 of a switch 109 at the end of the shutter resetting operation to break the circuit of driving motor 42.

As shown in Figures 2, 4, 8–12, the film magazine is provided with a pressure plate and vacuum system by which the film may be forced into the focal plane and held flatly therein during the exposure period. This pressure plate is generally indicated at 109 in Figure 2 and, as better shown in Figure 9, comprises a casting 110, in which are formed ports 111 and communicating channels 112 (see also Figure 4). Ports 111 communicate by way of holes 113 with grooves 114 formed in the bottom of casting 110, these grooves running longitudinally and horizontally across the bottom of the pressure plate, as shown in Figure 2. Disposed within each of ports 111 (Figure 9) is an inverted cup-like piece 115 which may be conveniently held in the port by a spring clip 116 or the like, a gasket 117 being interposed between the cup and the bottom of the port. The central port 111a of the pressure plate has a somewhat differently formed cup or insert 118, by which the interconnected ports are connected to a vacuum pipe 119, as will be described hereinbelow.

Adjacent ports, such as, for example, one of ports 111 and the central port 111a, are connected by tubing 120 which is preferably formed of a suitable plastic. We have found that the tubing may conveniently be connected to the cups 115 by inserting the tubing (see Figure 10) through a hole 115a in the cup. With the tubing in this position, a bushing 121 or the like (Figure 11) is inserted into the open end of the tubing, the outside diameter of the bushing being greater than the inside diameter of the tube, but somewhat less than the diameter of hole 115a. Thereupon the tubing 120 (Figure 12) may be pulled outwardly of cup 115 by any suitable tool so that bushing 121 squeezes the end of the tubing into hole 115a where the tubing end and bushing are thus securely clamped.

The insert 118 in the central port 111a of the pressure plate is of sufficient length to slidably receive a valve plunger 122 (Figure 9) having interconnected axial and transverse openings 123 and 124 formed therein. Opening 123 communicates opening 124 with port 111a and accordingly with all of the other ports 111 by way of the tubings 120 which interconnect the ports (see Figure 4). With the plunger 122 (Figure 9) in the position shown, its transverse opening 124 communicates with atmosphere by way of a hole 125 formed in the wall of insert 118. With the valve plunger in this position, the pressure plate, grooves 114, and the rest of the vacuum system, in so far as the pressure plate is concerned, is at atmospheric pressure. When, however, an exposure is being made, and it is desired that the film lie flat in the focal plane, plunger 118 is moved to its upper position in a manner to be described, so that hole 124 therein registers with vacuum pipe 119 and is sealed from atmosphere. This pipe 119 connects with nozzle 33 (see Figures 1 and 4) which nozzle may be connected to a vacuum pump or other device capable of pulling a vacuum.

As shown in Figure 3, the focal plane of the magazine is defined by a frame 126 which defines an aperture 127, and it is against this frame that pressure plate 109 is forced during the exposure period.

Figure 4:
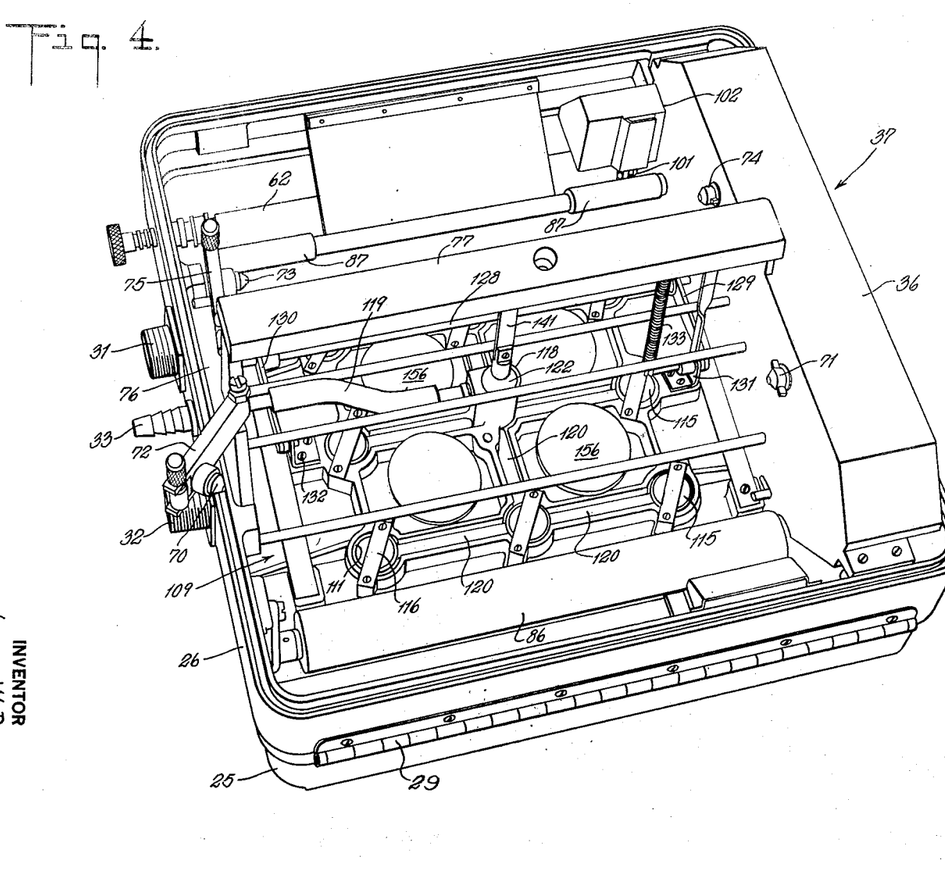
Figure 4 is a perspective view of the magazine with the top cover and film spools removed.

With reference to Figure 4, a shaft 128 has its left-hand end journaled in side plate 76, while its right-hand end extends into the mechanism unit 37 wherein it is connected for oscillation by the mechanism therein. To this shaft are connected a pair of arms 129 and 130, the outer ends of which are pivotally attached to brackets 131 and 132, respectively, these brackets in turn being fastened to the top of pressure plate 109. Thus after the film has been fed into position beneath the pressure plate by the mechanism hereinbefore described, shaft 128 is oscillated to force the pressure plate downwardly, thus to press the film against frame 126. After the exposure has been made, and the mechanism is actuated to feed unexposed film into position, shaft 128 is oscillated in the opposite direction so as to raise the pressure plate, this movement being assisted by the force of a spring 133 (Figure 4) stretched between beam 77 and the pressure plate.

Illustratively, the means by which shaft 128 is oscillated to raise and lower the pressure plate may include a cam 134 (Figures 7 and 8) which may be mounted on and rotated by shaft 52. This cam may operate a follower 135 mounted on one end of a lever 136, the other end of which is connected to shaft 128. Thus, as the cam rotates, the shaft is oscillated and the pressure plate raised and lowered, as described.

When the pressure plate has forced the film into the focal plane, it is desirable to actuate the vacuum system so that the film is sucked tightly and held against the bottom of the pressure plate. To this end, a link 137 (Figures 8 and 9) is also connected to bracket 131 and extends upwardly therefrom. The upper end of this link is pivotally connected to a lever 138 pivoted as at 139 to a bracket 140 fastened to beam 77. The other end of lever 138 is pivotally connected to a downwardly extending rod 141 whose lower end is connected in any suitable fashion, as by a coupling 142, to the upper end of plunger 122. It will now appear that when the pressure plate 109 is forced downwardly in the manner described, so is link 137. This rocks lever 138 counterclockwise, as viewed in Figure 9, so that its right-hand end rises and pulls plunger 122 to its uppermost position, wherein its transverse hole 124 communicates with exhaust pipe 119 and is sealed from the atmosphere. Thus the pressure plate is down, and the vaccum system is in communication with the grooves 114 which are accordingly evacuated, causing the film to be held tightly and flat against the bottom of the pressure plate in the focal plane.

Before describing the electrical operation, it should be noted that included in the motor circuit is a switch 143 (Figure 8) which is operated by a bell crank lever 144, i. e. one arm 144a of the bell crank operates the switch button 143a, the other arm 144b of the bell crank being engaged by a pin 145 on cam 134 every time the cam rotates, i. e. once per operative cycle.

From the above it can be seen that the camera magazine is a self-contained unit including not only a film supply, pressure plate, vacuum system and focal plane shutter, but complete operating mechanism including a motor therefor. Further it may be seen that through the hinged relationship between the upper and lower casings or housings 25 and 26, ready and easy access may be had to substantially all of the mechanism within the magazine. When the magazine is opened through the release of latches 30 (Figure 1) so that the two halves, so to speak, lie in the positions shown in Figures 2 and 3, it is easy to thread the film around the metering and pressure rollers and past the pressure plate 109 and secure the leading end of the film to the take-up spool.

Figure 14:
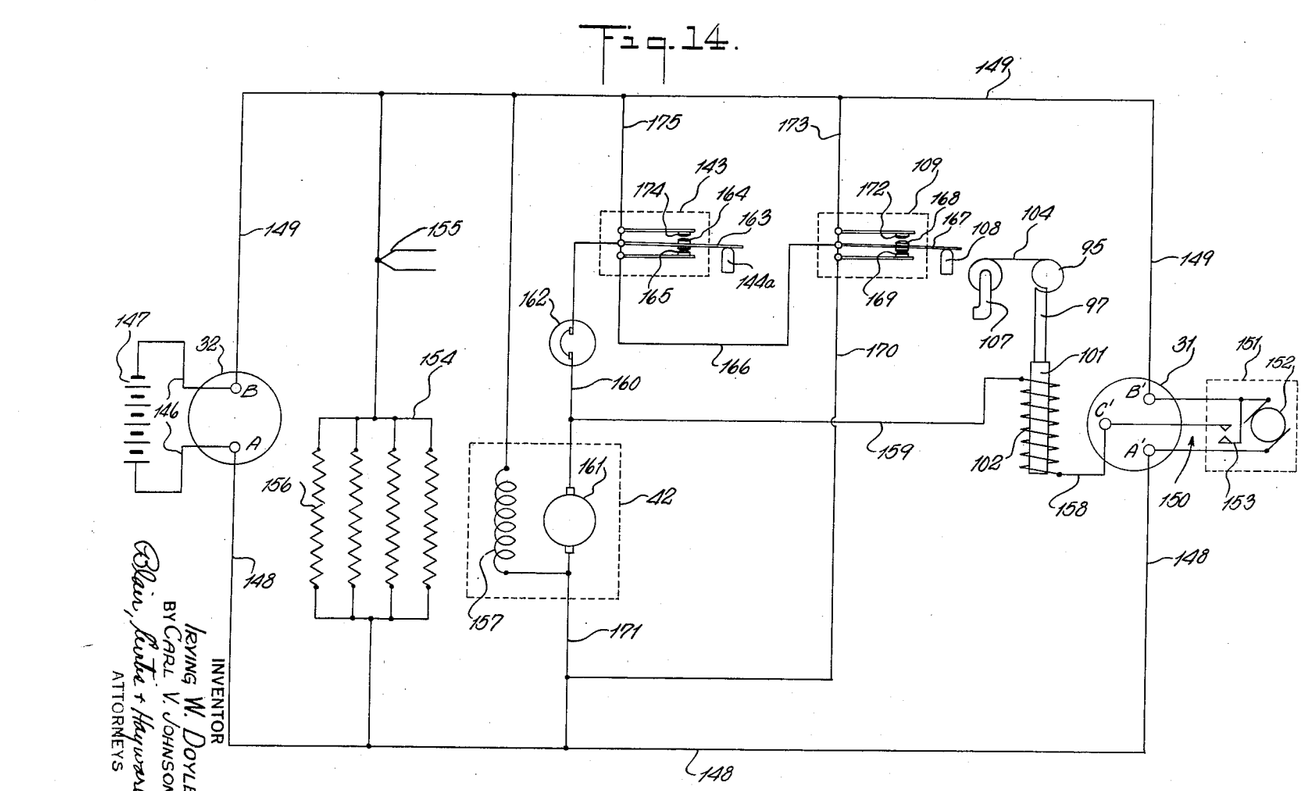
Figure 14 is a schematic wiring diagram of the magazine.

The operation of the magazine will perhaps be better understood with reference to the wiring diagram shown in Figure 14. In this figure, a two-wire cable 146 connects a power supply 147 to the power plug 32 of the magazine. This power plug includes terminals A and B, which are connected respectively by lines 148 and 149 to terminals A' and B' of the intervalometer plug 31 at the right-hand side of the wiring diagram. This plug is in turn connected by a three-wire cable 150 with an intervalometer 151 which may be of the type shown in the copending application of Leonard W. Gacki, Serial No. 520,575, filed January 31, 1944, now Patent No. 2,529,728, issued November 14, 1950. This intervalometer in brief, includes an operating motor 152 and contacts 153, which are periodically engaged at selectively spaced intervals to make a connection between terminals B' and C' of the intervalometer plug. It should be noted that the contacts in the magazine, as shown in the wiring diagram, are shown in the positions they occupy when the magazine is fully wound and ready to be tripped.

Connected across power terminals A and B to lines 148 and 149 is a heater 154, which is controlled by a thermostatic switch 155, this heater comprising a number of units 156 carried in the top of the magazine pressure plate (see also Figure 4). Also connected across the power terminals A and B is the field 157 of motor 42.

With the switch contacts in the position shown, current flows from terminal B' through the intervalometer to terminal C', thence by way of a line 158 to solenoid 102. From the solenoid the current flows through a lead 159 to a lead 160, which is connected to one side of the motor armature 161, and includes a motor cutout 162. Lead 160, in turn, conducts the current to the movable arm 163, carrying a contact 164, of switch 143 which, it will be recalled, is the switch which is operated by cam 134 (Figure 8). This contact 164 (Figure 14) is in engagement with a stationary contact 165 of the switch, which contact is connected by a lead 166 to the movable arm 168 of the shutter operated switch 109. This arm carries a contact 168 which engages a stationary contact 169 connected by way of a lead 170 to a lead 171 connecting the other side of motor armature 161 with line 148. Thus it may be seen that when the intervalometer contacts 153 are closed, a circuit is established through solenoid 102.

With the solenoid thus energized, its armature 110 is retracted to disengage pawl 97 from ratchet 95 to trip the shutter. At the end of the exposure operation of the shutter, the arm 107 operated thereby engages switch button 108, disengaging contacts 168 and 169, but engaging contact 168 with another stationary contact 172 of switch 109. This, of course, effects deenergization of solenoid 102 even though the intervalometer contacts may still be closed. Engagement between contacts 168 and 172 of switch 109 establishes a circuit through motor 142 as follows: power terminal B, line 149, lead 173 which connects line 149 to switch contact 172, switch contact 172, contact 168, lead 166, contacts 165 and 164, motor cutout 162, lead 160, motor armature 161, lead 171 and line 148 to power terminal A. The motor field 157 is, of course, always energized as long as the power source is plugged in.

With the motor thus energized, the operating mechanism described hereinbefore immediately starts, and as it does so, rotates cam 134 (Figure 8). This cam makes one revolution per cycle to a position where the pin 145 carried thereby rocks bell crank 144 to throw switch 143. Referring back to Figure 14, the movable arm 163 of switch 143 is accordingly swung counterclockwise to engage the contact 174 which is connected by a lead 175 to line 149. When this occurs, the motor continues to run, as it is still connected across the power terminals A and B. Shortly afterwards, however, when the shutter is wound, and in the winding thereof arm 107 has been withdrawn from switch button 108, contacts 168 and 169 of switch 109 reengage, while contacts 168 and 172 open. The motor still continues to run, however, until cam 134 (Figure 8) releases arm 163 (Figure 14) of switch 143 to separate contacts 164 and 174 and accordingly break the circuit through the motor armature. When this occurs, contacts 164 and 165 reengage, which short-circuits the armature as follows: armature 161, lead 160, cutout 162, contacts 164 and 165, lead 166, contacts 168 and 169, lead 170 and lead 171, to the other side of the armature. Since the motor field 157 is energized, rotation of the armature generates a current through this short-circuited path and this current reacts to create a backward E. M. F. which rapidly slows down the motor. Thus coasting or overrunning of the mechanism driven by the motor is effectively prevented.

At the same time that switch 143 is operated as described to shut off the motor, lead 159, which is connected to solenoid 102, is again connected to the power supply so that the intervalometer 151 may again trip the camera when its contacts 153 are closed.

Thus it will be seen that we have provided a camera and magazine therefor which attains the several objects set forth hereinabove in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

We claim:

1. In a unitary film magazine and focal plane shutter adapted to be separably mounted on a camera cone, the combination of upper and lower housings, means separably connecting said housings whereby they may be separated for ready access to the interior of each, a focal plane shutter in said lower housing, driven mechanism in said lower housing connected to said shutter adapted when driven to reset said shutter, remotely controllable shutter tripping means mounted in said casing in operative relationship to said shutter, and driving mechanism including film supporting and transporting means in said upper housing and connected to said film transporting means, said mechanisms including driving and driven meshable gears forming a separable driving connection between said driving mechanism in said upper housing and said driven mechanism in said lower housing, whereby when said housings are connected said driven mechanism may be operated to reset said shutter, said meshable gears comprising a mutilated gear connected to and operated by said driving mechanism, and a pinion connected to said driven mechanism said driving mechanism including a cycling device which at the end of one operative cycle juxtaposes the edentate portion of said mutilated gear to said pinion whereby when said housings are connected there is no interference between the teeth on said mutilated gear and those on said pinion.

2. Apparatus according to claim 1, wherein said driving mechanism includes an electric motor, means being provided for short-circuiting the armature of said motor at the end of the operative cycle to prevent coasting thereof.

IRVING W. DOYLE.
CARL V. JOHNSON.

REFERENCES CITED

The following references are of record in the file of this patent:

UNITED STATES PATENTS

| Number | Name | Date |
|---|---|---|
| 1,413,187 | Paumier | Apr. 18, 1922 |
| 1,612,860 | Fairchild | Jan. 4, 1927 |
| 1,661,364 | Fairchild | Mar. 6, 1928 |
| 1,707,849 | Fairchild | Apr. 2, 1929 |
| 1,764,066 | Chamberlin | June 17, 1930 |
| 1,804,680 | Fairchild | May 12, 1931 |
| 1,817,182 | Fairchild | Aug. 4, 1931 |
| 1,960,254 | McCandless | May 29, 1934 |
| 1,963,095 | Petit et al. | June 19, 1934 |
| 1,974,842 | Black | Sept. 25, 1934 |
| 2,003,691 | Lundberg | June 4, 1935 |
| 2,137,378 | Billing | Nov. 22, 1938 |
| 2,166,440 | Jones | July 18, 1939 |
| 2,257,100 | Belock | Sept. 30, 1941 |
| 2,271,221 | Drotning et al. | Jan. 27, 1942 |
| 2,282,291 | Whitman | May 5, 1942 |
| 2,283,788 | Briechle et al. | May 19, 1942 |
| 2,326,386 | Newman | Aug. 10, 1943 |
| 2,326,980 | Steiner | Aug. 17, 1943 |
| 2,350,693 | Mooman et al. | June 6, 1944 |
| 2,351,088 | Wilson | June 13, 1944 |
| 2,371,592 | Gorey et al. | Mar. 13, 1945 |
| 2,407,277 | Hineline | Sept. 10, 1946 |

FOREIGN PATENTS

| Number | Country | Date |
|---|---|---|
| 471,942 | Great Britain | Sept. 14, 1937 |
| 553,949 | Great Britain | June 11, 1943 |